(12) United States Patent
Kim

(10) Patent No.: US 12,396,826 B2
(45) Date of Patent: Aug. 26, 2025

(54) DENTAL IMPLANT ABUTMENT HAVING OCCLUSAL FORCE BUFFERING FUNCTION

(71) Applicant: DENFLEX CO., LTD, Seoul (KR)

(72) Inventor: Hyung Woo Kim, Goyang (KR)

(73) Assignee: DENFLEX CO., LTD, Seoul (KR)

( * ) Notice: Subject to any disclaimer, the term of this patent is extended or adjusted under 35 U.S.C. 154(b) by 8 days.

(21) Appl. No.: 17/607,052

(22) PCT Filed: Oct. 14, 2021

(86) PCT No.: PCT/KR2021/014213
§ 371 (c)(1),
(2) Date: Oct. 28, 2021

(87) PCT Pub. No.: WO2022/086048
PCT Pub. Date: Apr. 28, 2022

(65) Prior Publication Data
US 2023/0263601 A1 Aug. 24, 2023

(30) Foreign Application Priority Data

Oct. 20, 2020 (KR) .......................... 1020200135868
Aug. 5, 2021 (KR) .......................... 1020210103142

(51) Int. Cl.
*A61C 8/00* (2006.01)
(52) U.S. Cl.
CPC .................................. *A61C 8/0057* (2013.01)
(58) Field of Classification Search
CPC ... A61C 8/0057; A61C 8/0066; A61C 8/0065; A61C 8/0068; A61C 8/0078;
(Continued)

(56) References Cited

U.S. PATENT DOCUMENTS 5,782,918 A * 7/1998 Klardie ................ A61C 8/0069
433/172
7,524,188 B2 * 4/2009 Laux .................... A61C 8/0066
433/169
(Continued)

FOREIGN PATENT DOCUMENTS

CN           109223214 A  *  1/2019  .......... A61C 8/0012
KR     20170060539 A  *  7/2010

(Continued)

OTHER PUBLICATIONS

Office Action in corresponding KR Patent Application No. 1020210103142, dated Apr. 24, 2023.

*Primary Examiner* — Heidi M Eide
*Assistant Examiner* — Lina Faraj
(74) *Attorney, Agent, or Firm* — Nathan & Associates Patent Agents Ltd.; Menachem Nathan

(57) ABSTRACT

Disclosed is a dental implant abutment having a function of buffering occlusal force transmitted through a prosthesis and configured to be elastically coupled to the prosthesis without using an adhesive. A prosthesis fastening protrusion protrudes outward from an outer surface of an upper portion thereof on which a prosthesis is mounted. The diameter of the prosthesis fastening protrusion being greater than the diameter of a portion located directly therebelow. Indentations divide the upper portion of the abutment into a plurality of sections. The indentations continuously extend downward a predetermined length from a top end surface of the abutment. A predetermined lengthwise portion of each of the indentations has a spiral or oblique shape.

14 Claims, 18 Drawing Sheets

(58) Field of Classification Search
CPC ..... A61C 8/0086; A61C 8/006; A61C 8/0071; A61C 8/0072; A61C 8/0073; A61C 8/0074; A61C 8/0075; A61C 8/0077; A61C 8/00
See application file for complete search history.

(56) References Cited

U.S. PATENT DOCUMENTS

| | | | |
|---|---|---|---|
| 10,709,526 B2* | 7/2020 | Kim | A61C 8/0062 |
| 11,207,160 B2* | 12/2021 | Richard | A61C 8/0056 |
| 2006/0286508 A1* | 12/2006 | Bassett | A61C 8/0001 |
| | | | 433/172 |
| 2007/0054241 A1* | 3/2007 | Kim | A61C 8/0048 |
| | | | 433/173 |
| 2010/0248187 A1* | 9/2010 | Naert | A61C 8/005 |
| | | | 433/174 |
| 2014/0205970 A1* | 7/2014 | Courvoisier | A61C 8/0089 |
| | | | 433/174 |
| 2019/0321143 A1* | 10/2019 | Kim | A61C 8/0062 |
| 2022/0160474 A1* | 5/2022 | Kim | A61C 13/2656 |

FOREIGN PATENT DOCUMENTS

| | | | |
|---|---|---|---|
| KR | 101214748 B1 * | 12/2012 | |
| KR | 20180083760 A | 7/2018 | |
| KR | 101988194 B1 * | 6/2019 | |
| KR | 20200020025 A * | 2/2020 | |
| KR | 102099062 B1 * | 4/2020 | |

* cited by examiner

DENTAL IMPLANT ABUTMENT HAVING OCCLUSAL FORCE BUFFERING FUNCTION

TECHNICAL FIELD

The present disclosure relates to a dental implant abutment having a function of buffering occlusal force transmitted through a prosthesis and configured to be elastically coupled to the prosthesis without using an adhesive. More particularly, the present disclosure relates to a dental implant abutment having a structure in which a prosthesis fastening protrusion protrudes outward from the outer surface of the upper portion of the abutment on which the prosthesis is mounted, with the diameter of the prosthesis fastening protrusion being greater than the diameter of a portion located directly therebelow, and indentations continuously extend a predetermined length from the top end surface of the abutment to divide the upper portion of the abutment into a plurality of sections. A predetermined lengthwise portion of each of the indentations has a spiral or oblique shape, such that the prosthesis may be easily coupled to the upper portion of the abutment without using an adhesive by a simple manipulation using the elastic restorative force of the plurality of sections. Due to the structure of the spiral or oblique indentations, a sufficient buffering function may be obtained. Accordingly, occlusal force repetitively or continuously applied to the abutment may be efficiently buffered, thereby significantly reducing the untightening and fracture of the fixing screw. Since no adhesive is used in the coupling between the abutment and the prosthesis, the prosthesis may be easily fastened to and unfastened from the abutment, and the possibility of gum disease which would otherwise be caused by a portion of the adhesive remaining on or adjacent to the gum may be reduced.

BACKGROUND ART

In general, a dental implant is a substitute for a lost natural tooth. The dental implant refers to a natural tooth substitute produced by implanting a fixture to the alveolar bone so that the fixture is fused with the alveolar bone and then fixing an abutment and a prosthesis, such as an artificial tooth, on top of the fixture. In this manner, the original function of the tooth may be restored.

An implant used in artificial tooth procedures includes: a fixture having a thread formed on the outer circumferential surface thereof so as to be implanted to the alveolar bone and an axial hole formed along the vertical center axis thereof; an abutment, with the lower portion thereof being fitted into the axial hole of the fixture, and a prosthesis is attached to the upper portion thereof; and a fixing screw fastening and firmly fixing the abutment to the fixture. The abutment has a screw insertion hole formed along the vertical center axis. In some cases, the abutment and the fixing screw are provided integrally.

That is, the abutment is fastened and fixed to the fixture using a separate fixing screw or an integral fixing screw provided integrally on the lower portion thereof. The fixing screw of the related art includes a head, a threaded portion, and a body connecting the head and the threaded portion. A polygonal recess into which a tool is inserted is formed in the top end surface of the head. A thread is formed on the lower portion of the body, thereby forming the threaded portion.

In addition, in a case in which a fixing screw configured to be fastened with the fixture is provided separately, the abutment has a screw insertion hole extending from the top to the bottom thereof. The outer surface of the abutment includes a portion inserted into the axial hole of the fixture and a portion to which a prosthesis is attached. As illustrated in FIG. 3A, a stepped portion D for preventing downward movement of the fixing screw is formed on the inner surface of the screw insertion hole. The bottom surface C of the head of the fixing screw is configured to be in contact with the stepped portion D.

In a type in which the abutment and the fixing screw are separated, when the fixing screw is fastened with the fixture, a dentist places the abutment into the axial hole of the fixture and then inserts the fixing screw through the insertion hole of the abutment until the fixing screw arrives at the axial hole of the fixture. Afterwards, the fixing screw is rotated by fitting a tool, such as a screwdriver, into the polygonal recess formed in the top end surface of the head of the fixing screw, so that the bottom surface C of the head of the fixing screw is in contact with the stepped portion D formed on the inner surface of the screw insertion axial hole of the abutment to prevent downward movement of the fixing screw. Then, the head of the fixing screw presses the abutment toward the fixture. Consequently, in a position in which the thread formed on the outer surface of the fixing screw is fastened with the thread formed on the inner surface of the axial hole of the fixture, strong tension is applied between the head and the thread of the fixing screw. As a result, the abutment is strongly fixed to the fixture by the fixing screw. The prosthesis is coupled to the abutment, strongly fixed as described above, using an adhesive.

However, in such an implant of the related art obtaining the fastening force of the fixture and the abutment by strongly tightening the screw and fixing the prosthesis using the adhesive, the fixing screw of the related art is subjected to tension in the longitudinal direction by strongly tightening the fixing screw after fastening the fixing screw (i.e. a type of male screw) to the axial hole (i.e. a type of female screw) of the fixture. As a result, a significant amount of fastening force is generated due to the top surface of the thread of the fixing screw being strongly brought into contact with the bottom surface of the thread of the axial hole of the fixture. However, fundamental problems or limitations as will be described below may also be present.

For example, in a case in which tension between the head and the threaded portion of the fixing screw, by which the fixing screw may be strongly tightened so as to strongly fix the abutment to the fixture, is referred to as N, when tension generated by tightening the fixing screw is smaller than N, a sufficient amount of tension may not be obtained as intended, and thus, strong fastening force may not be provided, which is problematic.

That is, when tension smaller than N is applied between the head and the threaded portion of the fixing screw due to insufficient tightening, force by which the top surface of the thread of the fixing screw is in close contact with the bottom surface of the inner surface of the axial hole of the fixture is also reduced, thereby reducing the fastening force between the threads. In this situation, the fixing screw may be gradually untightened or loosened by only a small amount of rotational force generated by repetitive vibration or impact induced by occlusal force applied to the prosthesis, so that the abutment coupled to the fixture may shake.

In addition, in order to prevent such a problem, when the fixing screw is excessively tightened to apply tension much stronger than N to prevent the fixing screw from being untightened, the material of the fixing screw may be permanently deformed. In such a situation, fatigue may be accumulated on the material of the fixing screw. When another impact, such as occlusal force, is repetitively applied to the fixing screw, the fixing screw may be easily fractured, which is problematic.

Furthermore, when occlusal force is repetitively applied to the abutment of the related art in a variety of directions, stress may be directly transmitted to the fixing screw instead of being buffered and be accumulated between the head and the threaded portion of the fixing screw, thereby leading to the untightening and fracture of the fixing screw.

For example, as illustrated in FIG. 8, when lateral occlusal force is applied to the abutment, rotational force is generated in the abutment with respect to a portion of the abutment in close contact with a portion of the fixture. The rotational force generates force upwardly lifting the fixing screw that is strongly pressing the abutment downward. When such tension is repetitively accumulated, the fixing screw may be fractured, which is problematic.

In an internal type in which the abutment is fastened to the fixture with the lower portion of the abutment being inserted into the axial hole of the fixture, a sinking phenomenon may occur. That is, after the abutment is fastened to the fixture, the position of the abutment moves downward from the initial vertical position in the axial hole of the fixture at which the abutment was initially tightened with the fixing screw, due to occlusal force continuously applied without buffering. In this case, a gap may be formed between the bottom surface C of the head of the fixing screw and the stepped portion D for preventing downward movement of the fixing screw formed on the inner surface of the screw insertion hole of the abutment. The head of the fixing screw may no longer serve to press the abutment downward to fix the abutment to the fixture. Tension is not generated between the head and the threaded portion of the fixing screw, so that the top surface of the thread of the fixing screw is not strongly in contact with the bottom surface of the thread formed on the inner surface of the axial hole of the fixture. In this situation, the abutment may move within the axial hole of the fixture. Whenever occlusal force is applied in a variety of directions, tension may be concentrated to a specific portion instead of being uniformly distributed. As a result, problems, such as the fracture of the alveolar bone, the abutment neck, the fixture, the fixing screw, or the like, and the untightening of the fixing screw, may occur. In order to prevent such problems caused by the sinking phenomenon, a complicated method of fastening the abutment to the fixing screw and, after the use of the implant for a predetermined period, tightening the fixing screw again so as to strongly bring the head of the fixing screw into contact with the surface of the abutment generally needs to be performed. In addition, in a position in which the head of the fixing screw is in contact with one surface of the abutment and is strongly pressing the abutment toward the fixture, when lateral pressure is repetitively or continuously applied to the prosthesis, tension, lateral pressure, or the like is transmitted to the fixing screw through the abutment, so that the fixing screw may be untightened or fractured.

In addition, when the fixing screw is fractured for a variety of reasons as described above, in the related art, significant amounts of time and effort have been required to remove the remaining portion of the fractured fixing screw fastened to the female screw portion on the inner surface of the axial hole of the fixture. In some cases, the remaining portion of the fractured fixing screw may not be completely removed, which is problematic.

As described above, related-art abutments without an occlusal force buffering function have a variety of problems.

In addition, after the abutment is coupled to the fixture, the prosthesis may be coupled to the upper portion of the abutment by applying an additional adhesive to the inner portion of the prosthesis and the upper portion of the abutment, fitting the prosthesis to the upper portion of the abutment, and pressing the prosthesis in the direction of the abutment (i.e. downward direction) for a significant period of time. In this case, the dentist must additionally apply the adhesive to attach the prosthesis to the abutment and remove remaining portions of the adhesive one by one from the prosthesis, the abutment, the gum, or therebetween, and the patient must wait in a position in which the prosthesis is continuously pressed toward the gum. In this manner, a variety of complicated procedures and difficulties occur in the dental operation.

Furthermore, in a situation in which the prosthesis is fixed to the abutment using the adhesive, the adhesive may be detached due to repetitive or continuous occlusal force and thus, in some cases, the prosthesis may be detached and separated from the abutment. In case of removing the prosthesis fixed to the abutment for any reason, significant amounts of time and pain are required.

Technical Problem

Accordingly, the present disclosure has been made keeping in mind the above problems occurring in the prior art, and an objective of the present disclosure is to provide a dental implant abutment having a structure in which indentations may extend downward a predetermined length from the top end surface of an abutment to which a prosthesis is coupled to divide the upper portion of the abutment into a plurality of sections and predetermined lengths of the indentations are shaped to be spiral or oblique in order to increase the elasticity of the sections contributing to an occlusal force buffering function. The sections may be shaped to be helical and have increased lengths in order to maximize the elastic restorative force thereof. As a result, when occlusal force is applied, the sections may provide a buffering function due to the strong elastic force thereof. Accordingly, it is possible to solve the problems of related-art implants caused by the absence of the occlusal force buffering function, thereby increasing the lifetime of an implant.

According to another objective of the present disclosure, provided is a dental implant abutment in which, in the indentations dividing the upper portion of the abutment into the plurality of sections, the width of a portion of each of the indentations may be significantly smaller than the width of an upper portion of the indentation in order to increase the volume of the sections and thus complement for the strength of the sections. In addition, the sections may be shaped to be spiral or oblique to have slopes. When the sections are deformed by occlusal force, the sections may more rapidly come into contact with adjacent sections than sections defined by vertically-extending indentations, due to the significantly reduced width of the lower portions thereof and the slopes formed by the spiral indentations. Accordingly, the applied occlusal force may be effectively distributed to the adjacent sections.

In general, in the present disclosure, after the prosthesis is fixed to the abutment, the upper portion of which is divided into the plurality of sections by the indentations, when occlusal force is applied to the sections of the upper portion of the abutment divided by the indentations, an elastic movement for buffering the occlusal force and a restoring movement are required in order to realize the occlusal force buffering function. Thus, after the prosthesis is fixed to the abutment, a space between the sections must not be occupied by any material. Accordingly, when an adhesive occupying the space between the sections is used as a method of fixing the prosthesis to the abutment, the elastic movement of the sections is disabled, thereby substantially losing the buffering function. According to another objective of the present disclosure for overcoming this problem, provided is a dental implant abutment having an occlusal force buffering function. In the dental implant abutment, a prosthesis fastening protrusion, the diameter of which is greater than the diameter of a portion located directly therebelow, may be provided on the upper portion of the abutment divided into the plurality of sections for elastic coupling between the prosthesis and the abutment. When the prosthesis is fitted onto the upper portion of the dental implant abutment, the plurality of sections may be elastically deformed inward and be restored to the original shapes during entrance into a coupling hole of the prosthesis. Consequently, the prosthesis fastening protrusion may be simply and strongly coupled to a corresponding fastening recess of the prosthesis due to the elastic restorative force of the plurality of sections without an additional adhesive.

According to another objective of the present disclosure, provided is a dental implant abutment having an occlusal force buffering function. In the dental implant abutment, spiral, oblique, or vertical closed slots having closed top and bottom ends may be formed at predetermined distances along the circumference of the lower portion of the abutment configured to be fitted into the axial hole of the fixture. A plurality of independent surface portions formed along the circumference by the slots may strongly tighten the fixing screw, so that the fixing screw may be brought into close contact with the slope of the inner surface of the axial hole of the fixture while being deformed within the range of elastic deformation. At this time, elastic repulsive force generated by the surface portions deformed and in close contact within the range of elasticity may generate force that pushes the abutment upward, thereby generating force that continuously pushes the head of the fixing screw in contact with a stepped portion of the abutment for preventing downward movement of the fixing screw. As a result, the upper surface of the thread of the fixing screw may be strongly brought into contact with the lower surface of the thread on the inner surface of the axial hole of the fixture, thereby preventing the fixing screw from becoming unfastened. When occlusal force is applied, the fixing screw may be restored to the original shape after being elastically deformed.

According to another objective of the present disclosure, provided is a dental implant abutment in which a fixing screw is additionally provided. The fixing screw may have a spiral cut portion having the shape of a helix formed above or below the thread of thereof. The spiral cut portion may extend a predetermined length in the top-bottom direction to be in parallel to the vertical center axis of the fixing screw and half the cross-sectional surface perpendicular to the vertical center axis of the body. Due to this structure, the fixing screw may have sufficient amounts of tension and elastic restorative force and a buffering function. Strong fastening force may be maintained for a long period of time. Occlusal force repetitively or continuously applied in a lateral direction or a variety of other directions may be efficiently buffered, thereby preventing the fixing screw from being fractured by stress accumulation or concentration.

In addition, according to another objective of the present disclosure, when the fixing screw is fractured, it is possible to easily remove a remaining portion of the fixing screw from a female thread on the inner surface of the axial hole of the fixture by fitting a flat-blade screwdriver into the linear cut portion exposed on the surface of the remaining portion of the fractured fixing screw.

In addition, according to another objective of the present disclosure, the upper surface of the thread of the fixing screw and the lower surface of the thread formed on the inner surface of the axial hole of the fixture may be strongly fastened to each other by elastic force caused by the spiral cut portion between the head and the threaded portion of the fixing screw, such that there is no cold pressure welding. Thus, when the fixing screw is fractured, a remaining portion of the fixing screw may be easily removed.

In addition, according to another objective of the present disclosure, a lengthwise portion of the cut portion above the threaded portion of the fixing screw may have a spiral shape, i.e. a helical shape, such that strong elastic force is obtained. Thus, when the abutment is fastened to the fixture, the helical lengthwise portion of the fixing screw is deformed within the range of elastic deformation, thereby strongly coupling the abutment and the fixture. Even in the case that sinking occurs, i.e. the internal type abutment moves downward due to repetitive or continuous occlusal force, after the initial fastening between the abutment and the fixture, the helical lengthwise portion may bring the abutment into close contact with the fixture with a predetermined or greater amount of force while being elastically deformed without a process of retightening the fixing screw.

Technical Solution

According to an embodiment of the present disclosure, there is provided an embodiment of the present disclosure for realizing a dental implant abutment including: a prosthesis fastening protrusion protruding outward from an outer surface of an upper portion thereof on which a prosthesis is mounted, with the diameter of the prosthesis fastening protrusion being greater than the diameter of a portion located directly therebelow; indentations dividing the upper portion of the abutment into a plurality of sections. The indentations continuously extend downward a predetermined length from a top end surface of the abutment, and a predetermined lengthwise portion of each of the indentations has a spiral or oblique shape. An occlusal force buffering function is provided.

Advantageous Effects

According to the present disclosure, the prosthesis may be coupled to the upper portion of the abutment with a simple manipulation without the use of an adhesive, so that strong fastening force may be maintained between the prosthesis and the abutment for a long period of time. Occlusal force repetitively or continuously applied in a lateral direction or a variety of other directions may be efficiently buffered, thereby preventing the fixing screw from being untightened or fractured due to stress accumulation or concentration. The abutment may be prevented from being fused with the insertion portion of the axial hole of the fixture by cold pressure welding, so that the abutment may be easily detached and removed from the fixture as required. When the fixing screw is fractured, a portion of the fixing screw remaining on the female thread portion on the inner surface of the axial hole of the fixture by fitting a flat-blade screwdriver into the cut portion exposed on the surface of the remaining portion of the fractured fixing screw.

MODE FOR DISCLOSURE

Hereinafter, exemplary embodiments of the present disclosure will be described in more detail with reference to the accompanying drawings.

Figure 1A:
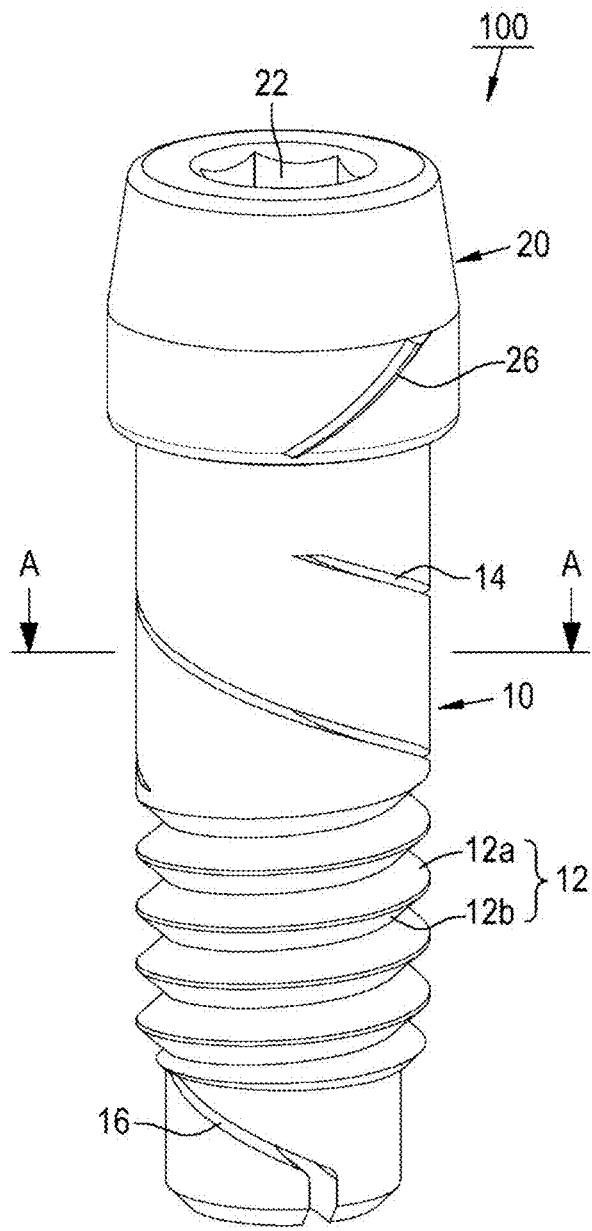
FIG. 1A is a perspective view illustrating a fixing screw according to an embodiment of the present disclosure.
Figure 1B:
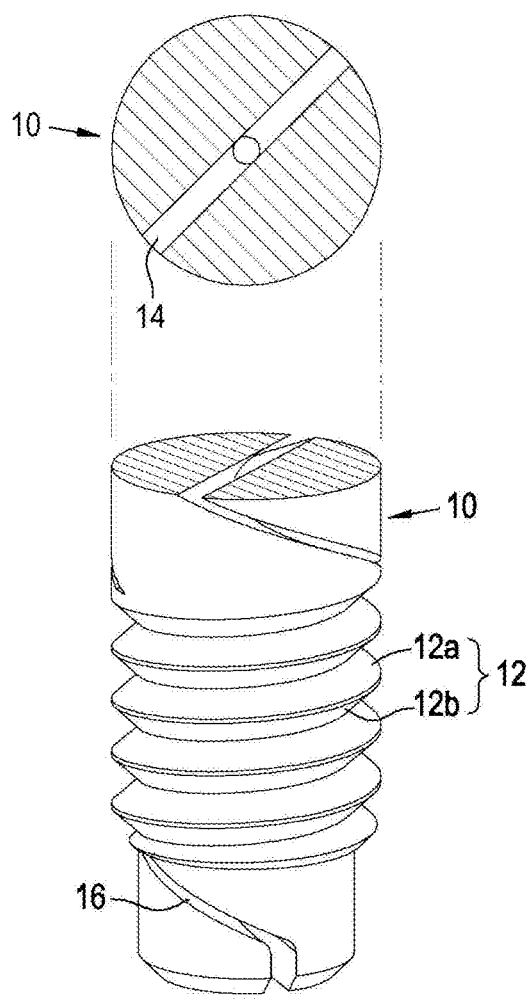
FIG. 1B is a cross-sectional view of the fixing screw taken along the line A-A in FIG. 1A and a perspective view thereof illustrating the cut surface.
Figure 2A:
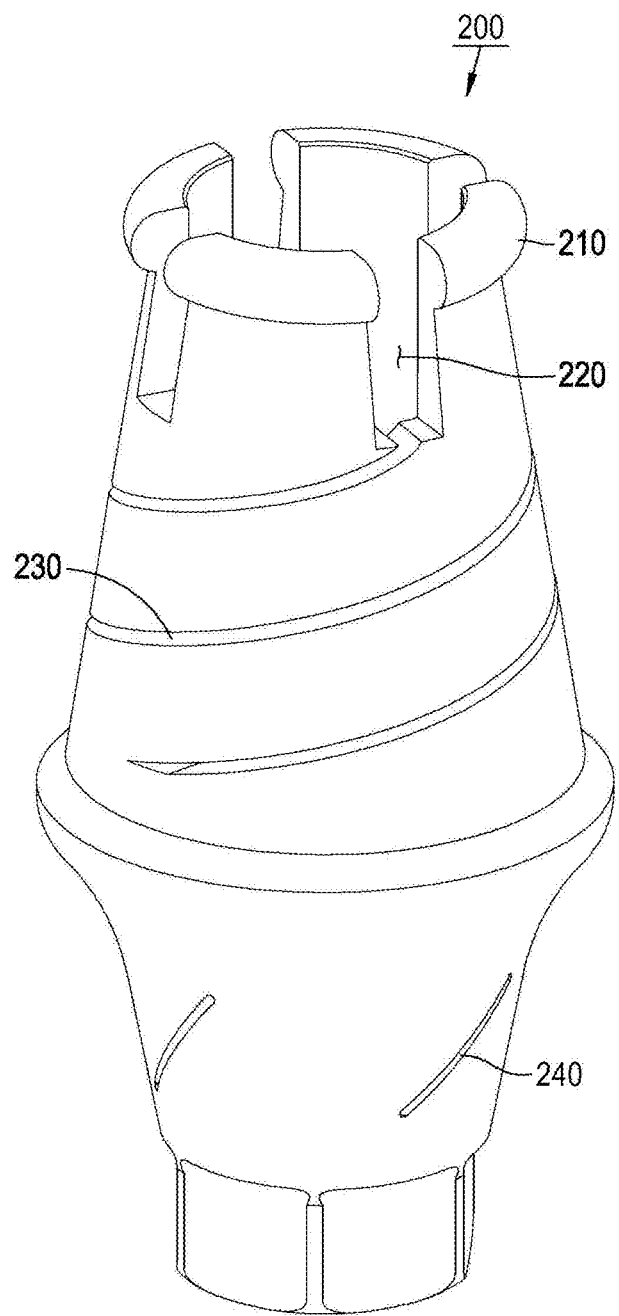
FIG. 2A is a perspective view illustrating an implant abutment according to the embodiment of the present disclosure.

FIG. 1A is a perspective view illustrating a fixing screw according to an embodiment of the present disclosure; FIG. 1B is a cross-sectional view of the fixing screw taken along the line A-A in FIG. 1A and a perspective view thereof illustrating the cut surface; FIG. 2A is a perspective view illustrating an implant abutment according to the embodiment of the present disclosure; and FIG. 2B is a perspective view illustrating an implant abutment according to another embodiment of the present disclosure.

Referring to FIG. 2A, in a dental implant abutment 200 according to the present disclosure, the outer surface of the upper portion thereof, on which a prosthesis is mounted, maintains a taper angle such that the outer diameter of the upper portion decreases in the upward direction from a portion in which a prosthesis margin portion is located, and the outer diameter of a portion thereof directly below the top end surface thereof is greater than a portion located directly therebelow, thereby forming a prosthesis fastening protrusion 210 protruding outward from a taper surface. In addition, as illustrated in FIGS. 2A and 2B, indentations 220 or 220' continuously extend downward a predetermined length from the top end surface of the abutment, thereby dividing the upper portion of the abutment into a plurality of sections. Particularly, the indentations 220 or 220' may be formed in at least two places in the upper portion of the abutment, thereby dividing the upper portion of the abutment into at least two sections. For reference, FIG. 2A illustrates the upper portion of the abutment divided into four sections by four indentations, while FIG. 2B illustrates the upper portion of the abutment divided into two sections by two indentations.

Figure 7:
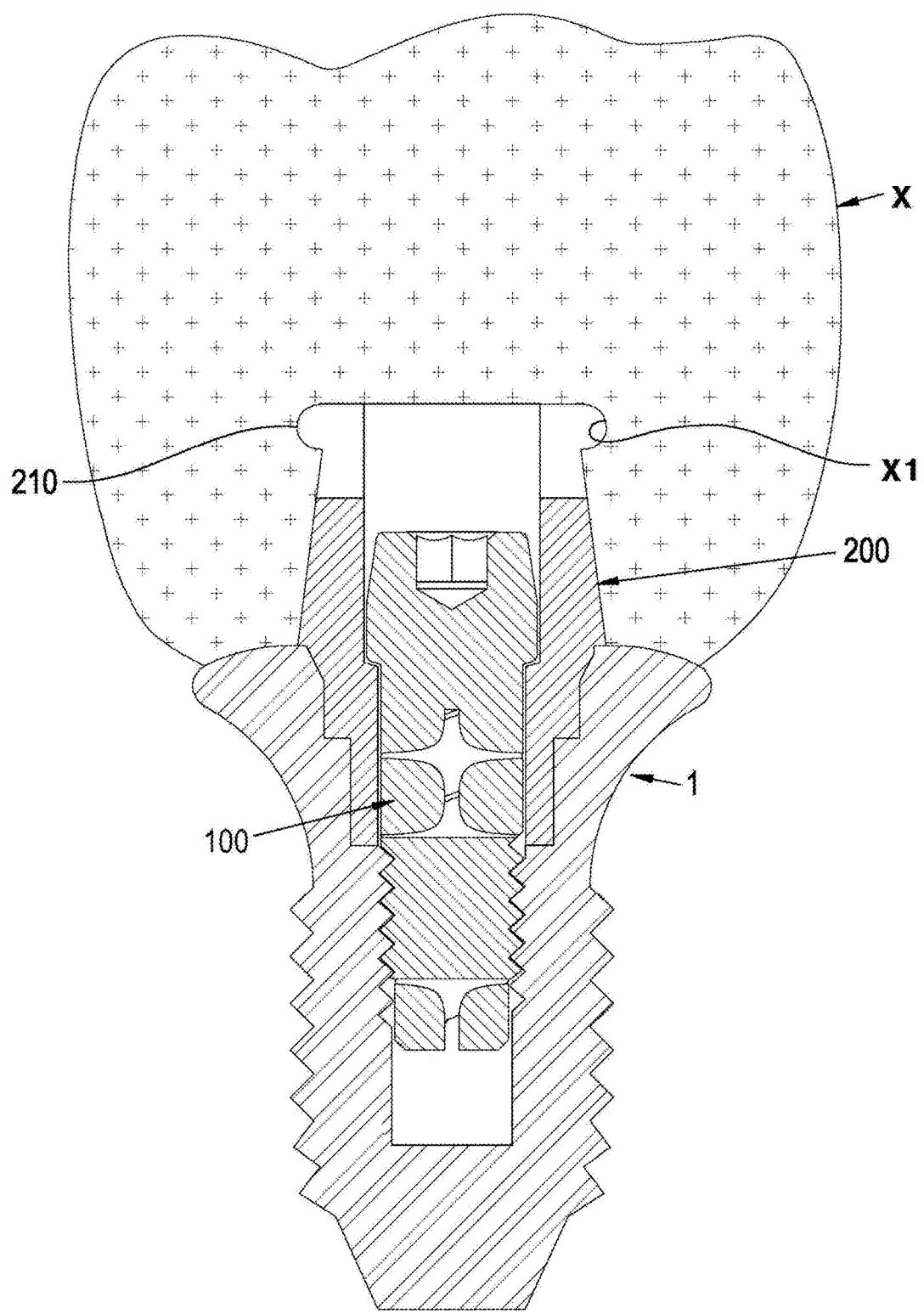
FIG. 7 is a cross-sectional view illustrating the abutment according to the present disclosure and a prosthesis attached to the upper portion of the abutment without an adhesive.

As described above, the upper portion of the abutment is divided into a plurality of sections by the indentations. Thus, when the prosthesis is coupled to the upper portion of the dental implant abutment according to the present disclosure by fitting, the plurality of sections may be elastically deformed inward while being introduced into a coupling hole of the prosthesis. Furthermore, when the prosthesis fastening protrusion 210 is engaged and fastened with a corresponding fastening recess X1 in the coupling hole of the prosthesis X, the prosthesis fastening protrusion 210 may be firmly coupled to the corresponding fastening recess X1 by the elastic restoring force of the plurality of sections. According to the present disclosure, as illustrated in FIG. 7, the prosthesis X may be coupled to the upper portion of the abutment 200 by a simple manipulation without the use of an adhesive.

Figure 2B:
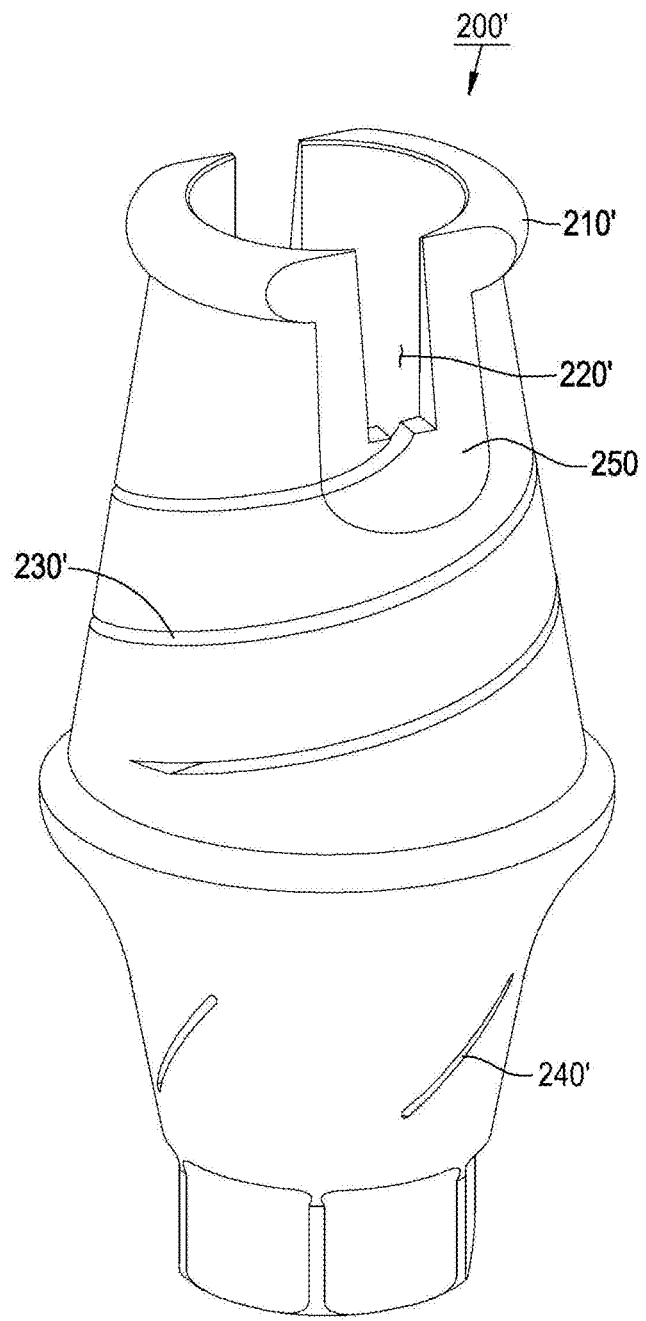
FIG. 2B is a perspective view illustrating an implant abutment according to another embodiment of the present disclosure.

Particularly, as illustrated in FIG. 2B, planar portions 250 are formed on portions of the circumferential surface on which a prosthesis fastening protrusion 210' is formed. The planar portions 250 have a taper angle the same as or greater than the taper angle of the abutment. The planar portions 250 serve to specify the direction in which the prosthesis is seated and prevent the prosthesis from rotating when the prosthesis is fixed.

More particularly, as illustrated in FIGS. 2A and 2B, the indentations 220 or 230 continuously extend downward a predetermined length from the top end surface of the abutment. Predetermined longitudinal sections of the indentations 220 or 230 may be shaped to be spiral or oblique. These spiral or oblique indentations are intended to further increase the elastic deformation force and the elastic restoring force of the upper portion of the abutment and complement for an occlusal force buffering function and a fixing screw unfastening prevention function of the abutment.

That is, a plurality of independent surface portions may be formed along the circumference by the spiral or oblique indentations 220 or 230 so as to complement for occlusal force while being deformed within the range of elasticity. In particular, when occlusal force is repetitively applied during chewing of foods, the plurality of independent surface portions formed along the circumference may complement for the occlusal force while being repetitively deformed and restored within the range of elastic deformation In particular, in the spiral or oblique indentations extending a predetermined length, the direction in which the indentations are cut from the top to the bottom may be the same as the direction in which the fixing screw is rotated to be fastened to the fixture. Thus, when occlusal force is applied to the abutment through the prosthesis, this configuration serves to guide force to act in the direction in which the fixing screw is fastened to the fixture therebelow in a process in which the occlusal force is transmitted through the spiral sections having the shape of a helix formed on the upper portion of the abutment. Consequently, an effect of preventing the untightening of the fixing screw may be obtained. In particular, in the abutment in which a portion thereof coupled to the fixing screw and a portion thereof coupled to the prosthesis are integral, the effect of preventing the untightening of the fixing screw may be more significant.

Figure 4A:
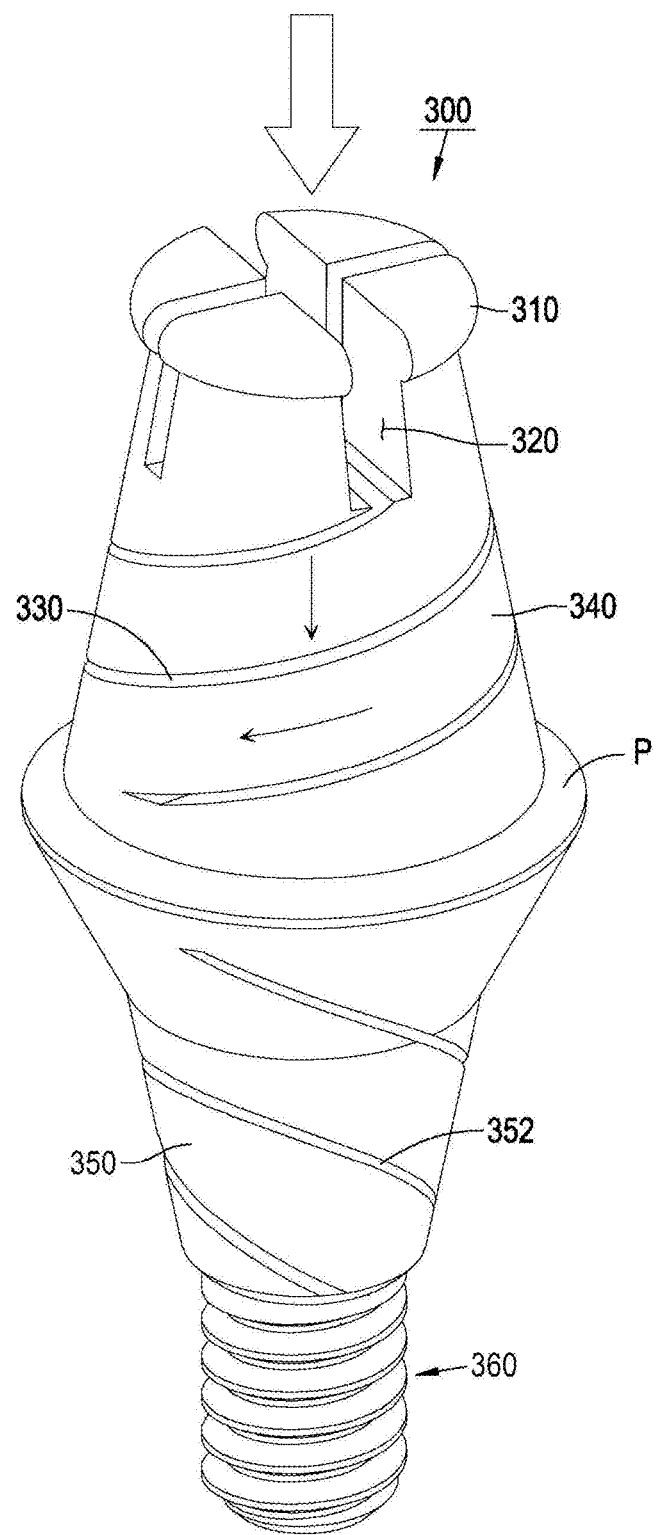
FIG. 4A is a perspective view illustrating an implant abutment according to yet another embodiment of the present disclosure.
Figure 4B:
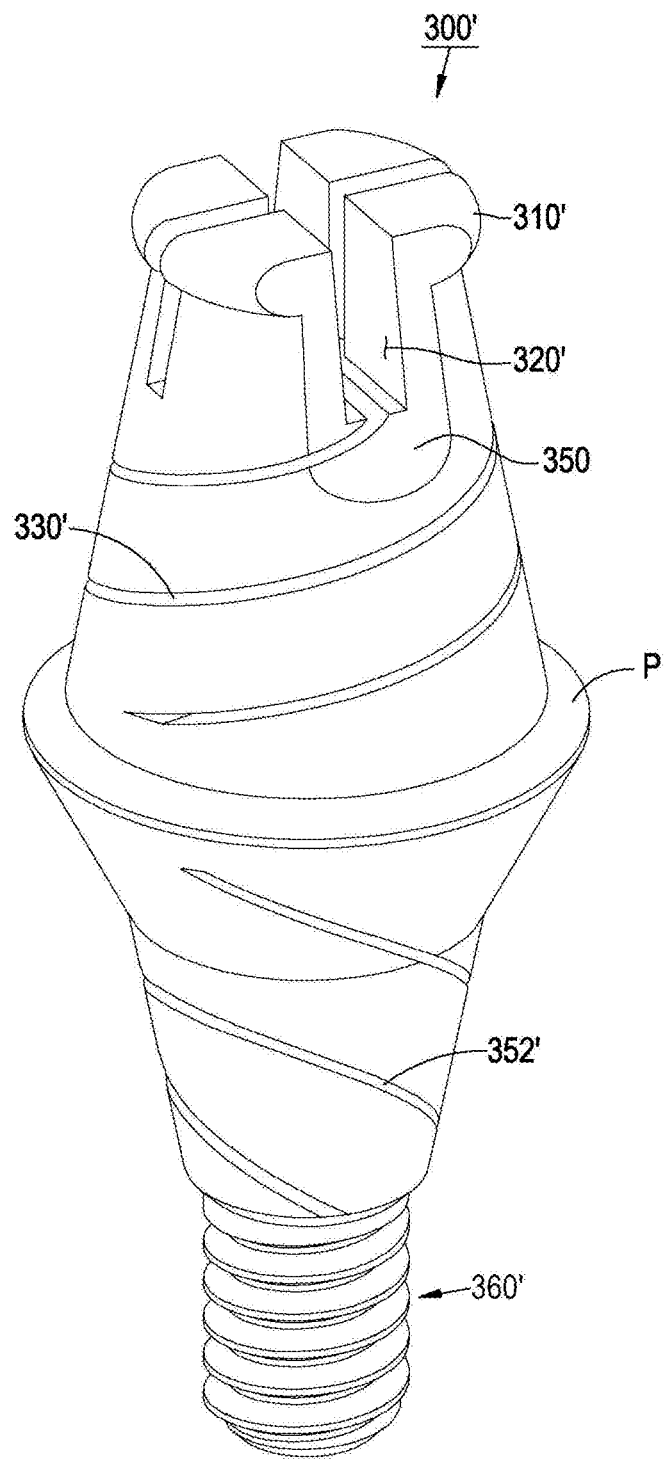
FIG. 4B is a perspective view illustrating an implant abutment according to another embodiment of the present disclosure.

FIG. 4A is a perspective view illustrating an implant abutment according to another embodiment of the present disclosure, and FIG. 4B is a perspective view illustrating an implant abutment according to another embodiment of the present disclosure.

Referring to FIGS. 4A and 4B, according to the other embodiments of the present disclosure, a dental implant abutment 300 has an integral structure of a prosthesis mounting portion and a threaded portion. The dental implant abutment 300 includes a threaded portion 360 having a predetermined vertical length and a thread formed on the outer circumferential surface thereof; a prosthesis mounting portion 340 formed integrally on top of the threaded portion 360, such that a prosthesis is fixed thereto; and a body 350 connecting the threaded portion and the prosthesis mounting portion and including a spiral cut portion 352 having the shape of a helix and extending a predetermined length in the longitudinal direction. The spiral cut portion 352 is formed to extend a predetermined length in the longitudinal direction of the vertical center axis of the body while being parallel to the vertical center axis of the body, thereby halving the cross-sectional surface of the body perpendicular to the vertical center axis.

As described above, as illustrated in FIG. 4A, the outer surface of the upper portion of the prosthesis mounting portion of the abutment, on which the prosthesis is mounted, maintains a taper angle such that the outer diameter decreases in the upward direction from a portion P in which a prosthesis margin portion is located, and the outer diameter of a portion thereof directly below the top end surface thereof is greater than a portion located directly therebelow, thereby forming a prosthesis fastening protrusion 310 or 310' protruding outward from a taper surface. In addition, as illustrated in FIGS. 4A and 4B, indentations 320 or 320' continuously extend downward a predetermined length from the top end surface of the abutment, thereby dividing the upper portion of the abutment into a plurality of sections. Predetermined longitudinal sections of the indentations 320 or 320' may be shaped to be spiral or oblique. Particularly, at least one indentation 320 or 320' may be provided in the upper portion of the abutment, thereby dividing the upper portion of the abutment into at least two sections.

As described above, the sections forming the protrusion, the diameter of which is greater than the diameter of a portion located directly therebelow, on the outer surface of the upper portion of the abutment may be deformed toward the vertical center axis and be restored to the original shape during mounting of the prosthesis, so that the abutment may be coupled to the prosthesis without an adhesive. In addition, since the sections extending a predetermined length have the shape of a spiral or linear helix rotatable about the vertical center axis of the abutment due to the spiral or oblique indentations, occlusal force applied during chewing of foods may be buffered.

Particularly, planar portions 350 are formed on portions of the circumferential surface on which the prosthesis fastening protrusion 310' is formed. The planar portions 350 have a taper angle the same as or greater than the taper angle of the abutment. The planar portions 350 serve to define a direction in which the prosthesis is seated and prevent the prosthesis from rotating.

Referring to FIGS. 1A and 1B, a fixing screw 100 separately provided on the dental implant abutment according to the present disclosure includes a threaded portion 12 having a predetermined vertical length, with a thread comprised of thread surfaces 12a and 12b being formed on the outer circumferential surface thereof; a head 20 provided above the threaded portion and having a polygonal coupling recess 22 formed in the top end surface thereof such that a screwdriver is fitted into the coupling recess 22; and a body 10 connecting the threaded portion 12 and the head 20 and having a spiral cut portion 14 in the shape of a helical extending a predetermined length in the longitudinal direction.

Particularly, as illustrated in FIG. 1B, the spiral cut portion 14 extends a predetermined length in the longitudinal direction of the vertical center axis of the body 10 while being parallel to the vertical center axis of the body 10, thereby halving the cross-sectional surface of the body perpendicular to the vertical center axis. The spiral cut portion 14 may extend either in the clockwise direction or the counterclockwise direction. In addition, the spiral cut portion 14 may be selectively formed in threaded portion 12. Furthermore, the body 10 may have an extension provided below the threaded portion 12. A spiral cut portion 16 may additionally be provided in the extension of the body 10.

In addition, particularly, the spiral cut portion having the shape of a helix provided between the head and the threaded portion of the fixing screw may be cut in the same direction as the threaded portion of the fixing screw.

Referring to FIGS. 2A and 2B, the dental implant abutment 200 according to the present disclosure has a plurality of slots 240 or 240' formed in the lower portion of the abutment configured to be fitted into the axial hole of a fixture. Particularly, a plurality of slots 240 or 240' are formed in the lower portion of the abutment that is fitted into the axial hole of the fixture. The slots 240 or 240' are provided along the circumference and at predetermined distances from each other. At least one end of each of the slots 240 or 240' is closed. The slots 240 or 240' extend from the outer diameter to the inner diameter of the abutment. Particularly, the slots 240 or 240' may have the shape of oblique lines, vertical lines, horizontal lines, or the like.

When the fixing screw is strongly tightened, the slots 240 or 240' cause a plurality of surface portions independently formed along the circumference by the oblique slots to be deformed within the range of elasticity and to be in close contact with slopes of the inner surfaces of the axial hole of the fixture. At this time, elastic repulsive force generated by the surface portions deformed and in close contact within the range of elasticity generates force that pushes the abutment upward, thereby generating force that continuously pushes the head of the fixing screw in contact with a stepped portion D of the abutment for preventing downward movement of the fixing screw. As a result, the upper surface of the thread of the fixing screw may be strongly brought into contact with the lower surface of the thread on the inner surface of the axial hole of the fixture, thereby preventing the fixing screw from becoming unfastened.

In addition, the plurality of independent surface portions formed along the circumference may be repetitively or continuously deformed and restored within the range of elastic deformation, thereby buffering repetitive or continuous occlusal force applied during chewing of foods. Due to this operation, the abutment may be strongly brought into contact with the insertion axial hole of the fixture, thereby preventing cold pressure welding. Accordingly, the abutment may be easily separated from the fixture when required.

Figure 3A:
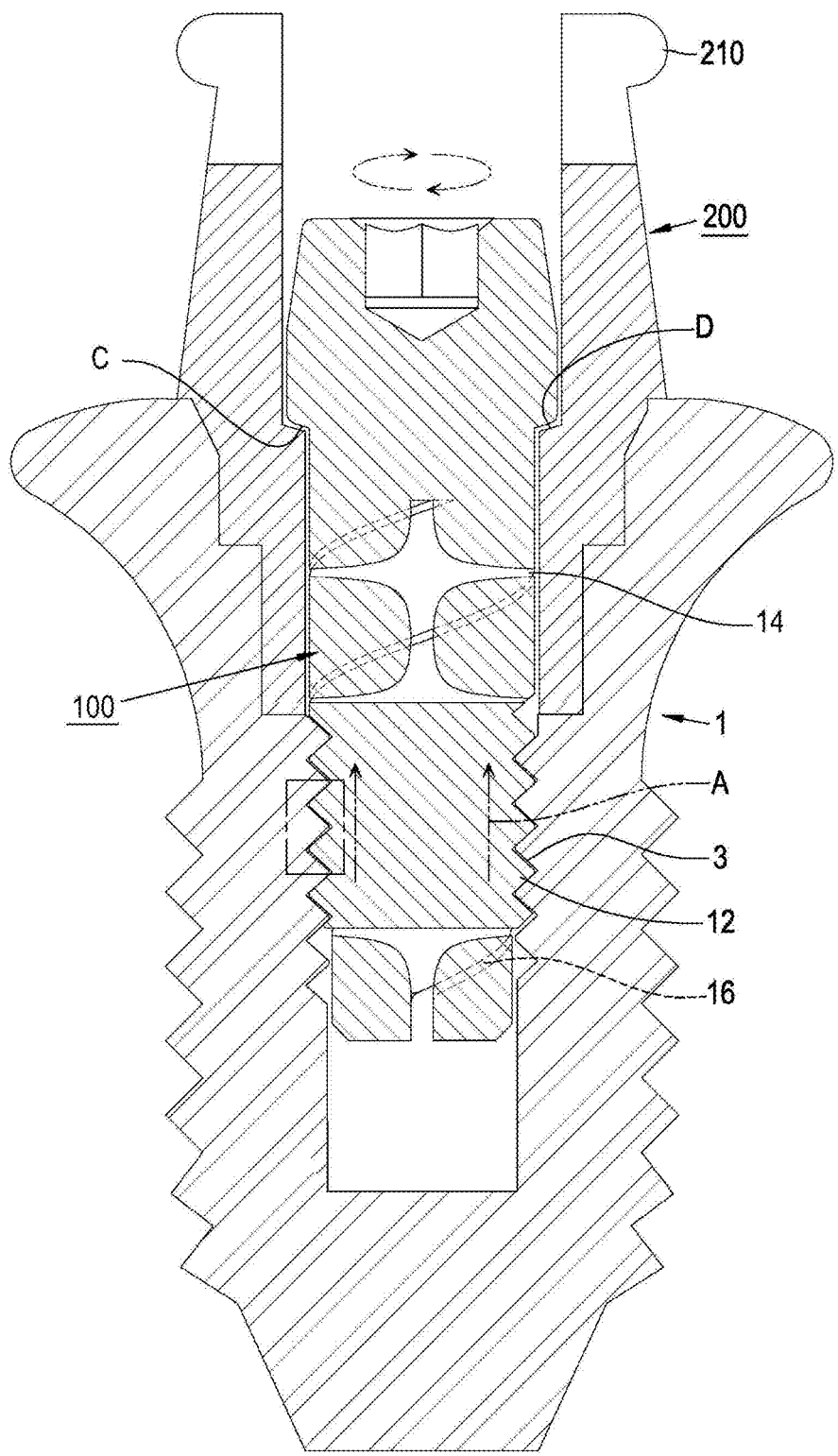
FIG. 3A is a cross-sectional view illustrating a position in which the fixing screw illustrated in FIG. 1A, separately provided according to the embodiment of the present disclosure, is coupled to the implant abutment illustrated in FIG. 2A.
Figure 3B:
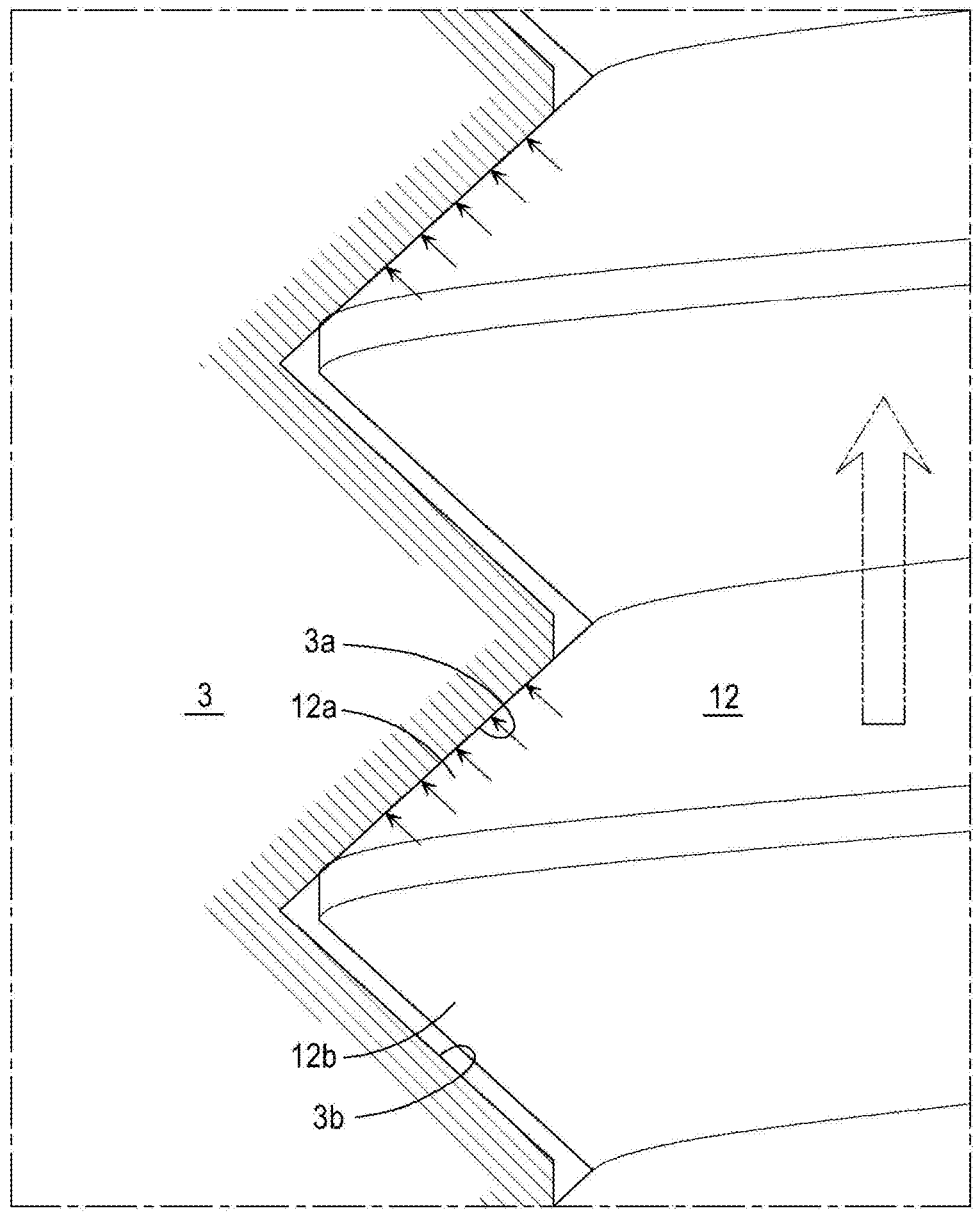
FIG. 3B is a conceptual view illustrating the operation of the fixing screw with respect to the implant abutment in the coupled position illustrated in FIG. 3A.

FIG. 3A is a cross-sectional view illustrating a position in which the fixing screw illustrated in FIG. 1A, separately provided according to the embodiment of the present disclosure, is coupled to the implant abutment illustrated in FIG. 2A, and FIG. 3B is a conceptual view illustrating the operation of the fixing screw with respect to the implant abutment in the coupled position illustrated in FIG. 3A.

Referring to FIGS. 3A and 3B, the spiral cut portion 14 formed in the body 10 of the fixing screw 100 serves to increase the elastic deformation force and the elastic restorative force of the fixing screw, thereby enabling the fixing screw according to the present disclosure to more firmly fasten the abutment to the fixture than a fixing screw of the related art. That is, due to the spiral cut portion 14, the fixing screw 100 of the present disclosure may have an increase in the elastically-deformable absolute length thereof while having stronger elastic restorative force after elastic deformation. Thus, the fixing screw 100 may obtain a greater amount of fastening energy, i.e. stronger fastening force, so as to have stronger fastening force than the fixing screw of the related art, thereby preventing the fixing screw from becoming unfastened, which is problematic.

The spiral cut portion 14 may be provided in a specific section of the body 10 between the top end and the bottom end thereof. Particularly, the spiral cut portion 14 is formed in a portion of the body 10 connecting the threaded portion 12 and the head 20. Referring to FIGS. 3A and 3B, in a position in which the threaded portion 12 of the fixing screw 100 is engaged with a thread 3 formed on the inner surface of the axial hole of a fixture 1, when the fixing screw is continuously tightened, the fixing screw 100 is stretched a predetermined length within the range of elastic deformation by the elastic force of the spiral cut portion 14. Due to the elastic restorative force of the spiral cut portion 14, the threaded portion 12 of the fixing screw is strongly pulled upward, as indicated by arrows in FIG. 3A. Thus, as illustrated in FIG. 3B, the upper surface 12a of the thread of the fixing screw may be strongly brought into contact with a lower surface 3a of the thread formed on the inner surface of the axial hole of the fixture 1 in a corresponding manner, thereby obtaining stronger fastening force between the engaged threads. Accordingly, the untightening of the fixing screw may be significantly reduced.

Particularly, the spiral cut portion having the shape of a helix, formed between the head and the threaded portion of the fixing screw, may be formed in the same direction in which the threaded portion of the fixing screw is formed.

Figure 5:
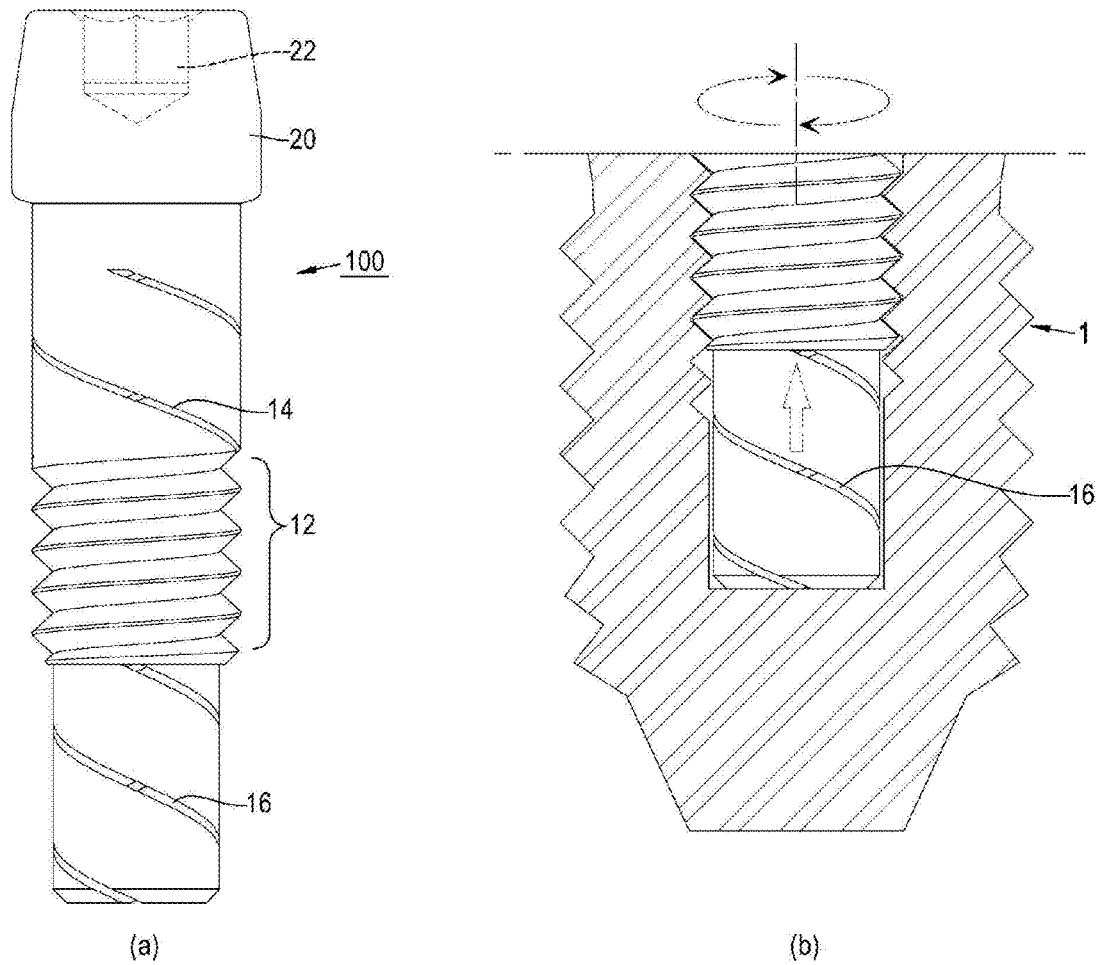
FIG. 5A is a cross-sectional view illustrating a fixing screw according to another embodiment of the present disclosure.
FIG. 5B is a conceptual view illustrating the operation of the fixing screw illustrated in FIG. 5A.

Particularly, as illustrated in FIGS. 5A, 5B, and 5C, the spiral cut portion 16 having the shape of a helix may also be formed in the bottom portion of the threaded portion 12 of the body 10. In this case, when the fixing screw 100 is continuously and strongly tightened even after the distal end of the fixing screw is in contact with the lower surface of the axial hole of the fixture, the lower surface of the axial hole of the fixture is in contact with the lower surface of the fixing screw. Then, the helical-shaped spiral cut portion below the threaded portion is compressed, thereby generating elastic restorative force. The elastic restorative force acts to strongly push the threaded portion of the fixing screw upward. Thus, in the same manner as in FIG. 3B, the upper surface 12a of the thread of the fixing screw may be strongly brought into contact with the lower surface 3a of the thread formed on the inner surface of the axial hole of the fixture 1 in the corresponding manner, thereby obtaining stronger fastening force. As a result, the unfastening of the fixing screw may be significantly reduced. The fixing screw according to the present disclosure may be made of a metal, such as a Ni—Ti alloy, having superior elasticity.

More particularly, as illustrated in FIG. 1A, the head 20 of the fixing screw 100 may further include a screw unfastening preventing protrusion 26 on a predetermined portion of the outer circumferential surface. For example, in a case in which the implant abutment 200 illustrated in FIG. 2A is fastened with the fixture using the fixing screw 10, the screw unfastening preventing protrusion 26 may be fitted into and engaged with the spiral or oblique cut portion 230 formed in the upper portion of the abutment, thereby preventing the unfastening of the fixing screw in a complementary manner.

As described above, when the fixing screw 100 according to the present disclosure is fastened within the range of elastic deformation, elastic force and elastic restorative force stronger than those of the fixing screw of the related art may be obtained due to the spiral cut portions 14 and 16. Thus, force by which the upper surface 12a of the thread of the fixing screw is brought into contact and presses the lower surface 3a of the thread formed on the inner surface of the axial hole of the fixture may be more strongly and continuously maintained. As a result, as an advantage, even after the elapse of a long time, the fastening force by which the abutment 200 is fastened to the fixture 1 is not reduced.

Referring to FIGS. 1A, 5A, and 5B, the spiral cut portions 14 and 16 formed in the body 10 of the fixing screw may perform a stress buffering function due to the structural characteristics and the elastic restorative force thereof. That is, even in the case that the fixing screw is pushed in a lateral direction or the head of the fixing screw is lifted upward due to lateral pressure applied to the abutment in a variety of directions by occlusal force or the like, the structures of the spiral cut portions may buffer such force. As a result, stress applied in a lateral direction or from above is not accumulated in the fixing screw, and thus, the possibility of the fracture of the fixing screw is significantly reduced.

In addition, the related-art problem of the internal type in which the abutment is fastened to the fixture, with the lower portion of the abutment being inserted into the axial hole of the fixture, may be solved by the elastic restoring operation of the spiral cut portions. That is, as described above, even after the fixing screw is fastened with strong fastening force, the abutment may sink downward over time. Even in the case that the abutment is moved downward from the initially-fastened position due to this sinking phenomenon, the head on the top end of the fixing screw may be pulled downward due to the elastic restoring operation of the spiral cut portions, thereby maintaining strong fastening force.

In addition, even in the case that the fixing screw is fractured for a variety of reasons, portions in which the spiral cut portions are formed, i.e., relatively-weak points, may be fractured. In this case, as illustrated in FIG. 1B, the spiral cut portion exposed on the fractured surface has the shape of a straight line extending through the vertical center axis. Accordingly, it is possible to easily remove a remaining portion of the fixing screw from the axial hole of the fixture by fitting a flat-blade screwdriver into the linear cut portion and rotating the flat-blade screwdriver.

Figure 6:
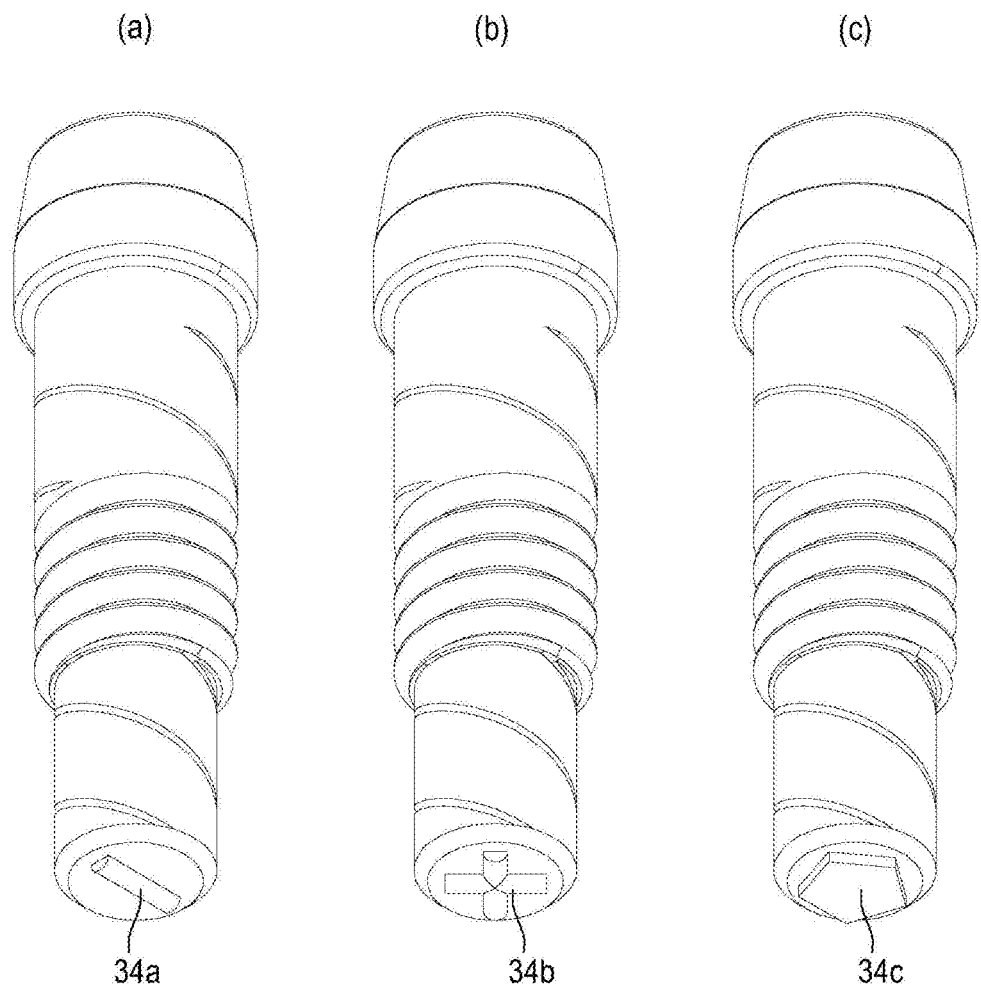
FIG. 6 is perspective views illustrating fixing screws according to other embodiments.

FIG. 6 is a perspective view illustrating fixing screws according to other embodiments of the present disclosure. Referring to FIG. 6, a spiral cut portion having the shape of a helix may be formed in the lower portion of the threaded portion of the fixing screw according to the present disclosure. In addition, a linear protrusion 34*a*, a cross-shaped protrusion 34*b*, or a polygonal protrusion 34*c* may be formed on the bottom end surface of the fixing screw and a corresponding recess may be formed in the lowermost surface of the axial hole of the fixture, thereby defining a position at which the fixing screw is rotated and fastened. The fixing screw unfastening prevention function may be additionally performed.

That is, when the fixing screw is tightened, the protrusion on the bottom end surface of the fixing screw comes into contact with a surface portion of the lower surface of the axial hole of the fixture above the lowermost surface in which the corresponding recess is formed. When the fixing screw is continuously tightened from this position, the spiral cut portion having the shape of a helix below the threaded portion of the fixing screw is rotated while being compressed. At a point at which the protrusion on the bottom end surface of the fixing screw coincides with the corresponding recess formed in the lowermost surface of the axial hole of the fixture, the protrusion on the bottom end surface of the fixing screw is coupled to the recess in the lowermost surface of the axial hole of the fixture due to elastic restorative force of the spiral cut portion below the threaded portion of the fixing screw. Since a predetermined or greater amount of horizontal rotational force must be directly applied to the fixing screw to release this coupling, the fixing screw may not be untightened by occlusal force that occurs ordinarily. Accordingly, the function of preventing the fixing screw from being untightened may be performed.

Figure 8:
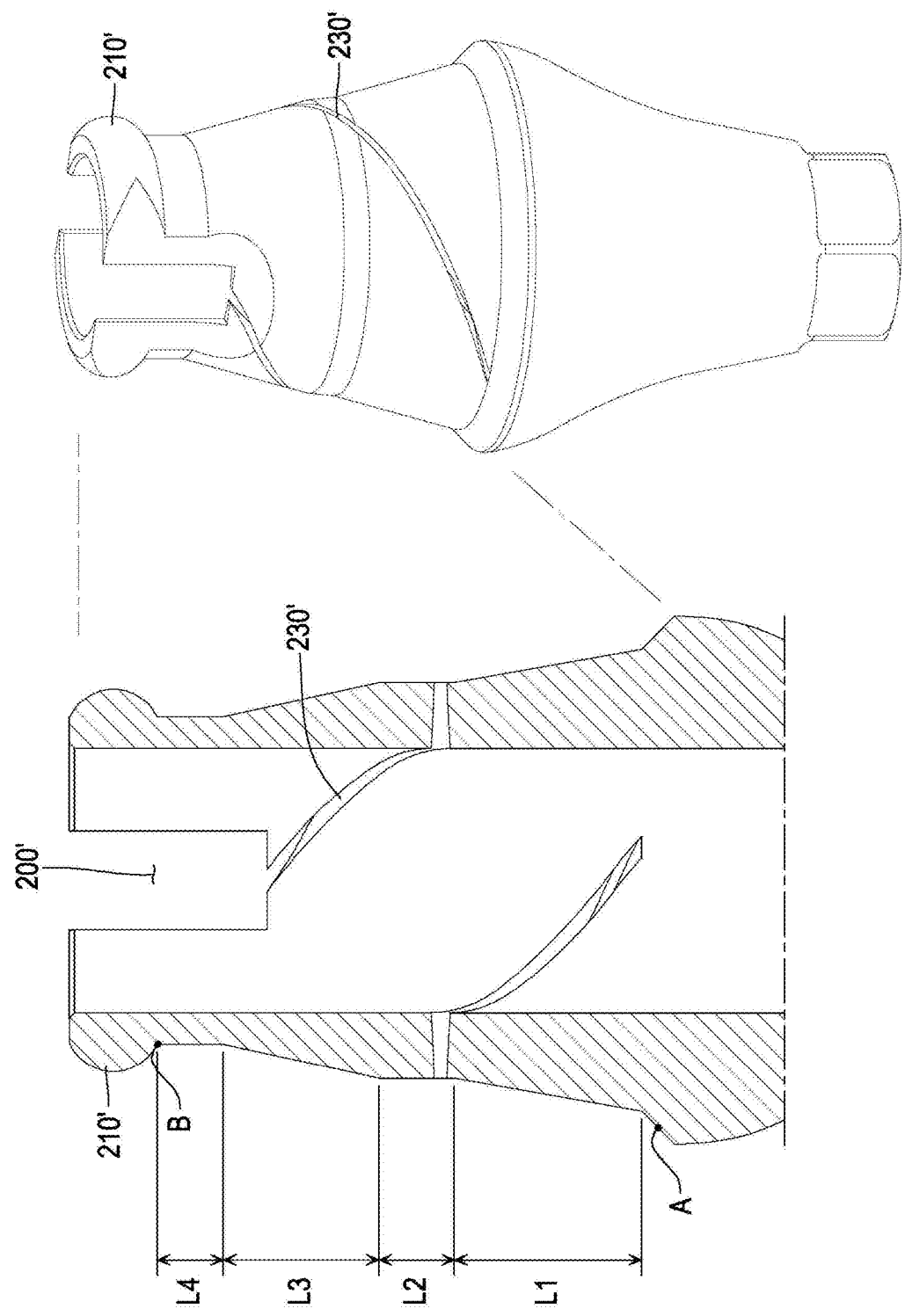
FIG. 8 is a cross-sectional view illustrating a modified embodiment having a change in the degree of slope of an outer surface of an abutment according to another embodiment of the present disclosure.

FIG. 8 is a cross-sectional view illustrating a modified embodiment having a change in the degree of slope of an outer surface of an abutment according to another embodiment of the present disclosure. Referring to FIG. 8, between an upper point A (preferably, an upper 1.5 mm point) of the maximum diameter portion of the abutment on which a prosthesis margin is located and a portion B directly below a prosthesis fastening protrusion 210', there are at least two changes in the degree of slope of the outer surface of the abutment. That is, the outer side surface of the abutment may include a first sloped outer side surface L1, a first vertical outer side surface L2, a second sloped outer side surface L3, and a second vertical outer side surface L4 sequentially upward from the upper point A of the maximum diameter portion of the abutment. Since the outer side surface of the abutment is configured to have two or more changes in the degree of slope thereof in this manner, it is possible to increase the horizontal thickness of the prosthesis fastening protrusion on the upper portion of the abutment. Consequently, when the prosthesis is fastened to the prosthesis fastening protrusion on the upper portion of the abutment, the strength of coupling may be enhanced or increased. For example, when the angle of slope is the same from the upper point A of the maximum diameter portion of the abutment to the bottom of the prosthesis fastening protrusion, the horizontal thickness of the prosthesis fastening protrusion on the upper portion of the abutment may be excessively thin. Consequently, when the prosthesis is fastened later, the prosthesis fastening protrusion may not be firmly coupled to or firmly hold the prosthesis, thereby causing the prosthesis to shake or be fractured, which is problematic.

Figure 9:
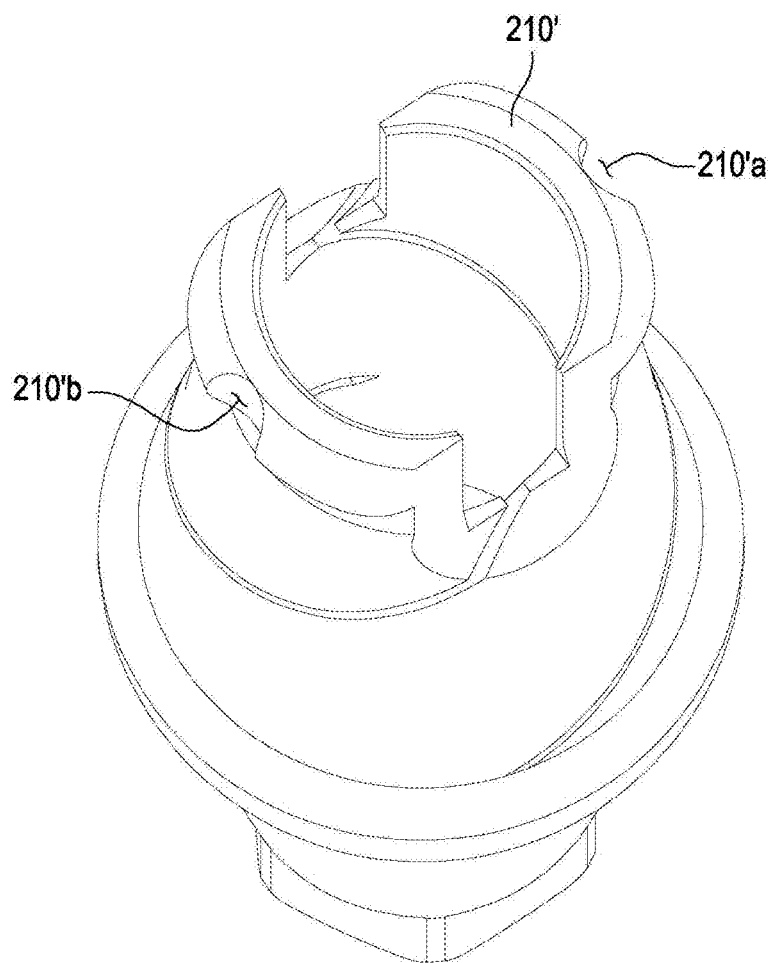
FIG. 9 is a perspective view illustrating a modified embodiment of a prosthesis fastening protrusion according to another embodiment of the present disclosure.

FIG. 9 is a perspective view illustrating a modified embodiment of a prosthesis fastening protrusion according to another embodiment of the present disclosure. Referring to FIG. 9, a prosthesis fastening position recess 210'*a* depressed inward is additionally provided in the prosthesis fastening protrusion 210'. During mounting of the prosthesis, the prosthesis fastening position recess 210'*a* may specify a fastening position of the prosthesis and prevent the prosthesis from rotating. That is, the prosthesis fastening protrusion recess 210'*a* may serve to specify to a dentist an accurate fastening position for the prosthesis to be located during prosthesis procedures and, upon completion of prosthesis procedures, prevent the prosthesis from being rotated by force applied to the prosthesis.

Figure 10:
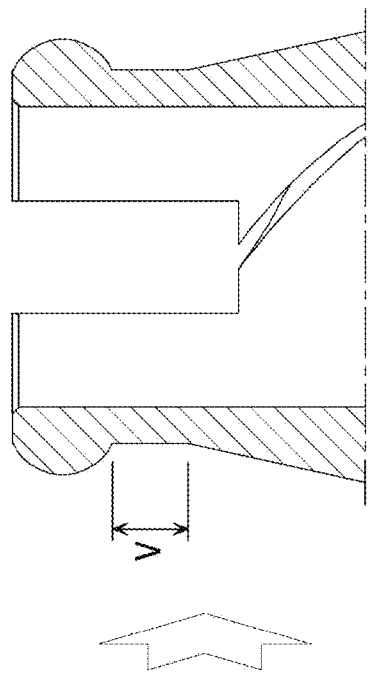
FIG. 10 is a cross-sectional view illustrating a modified embodiment of the upper portion of an abutment according to another embodiment of the present disclosure.
Figure 10:
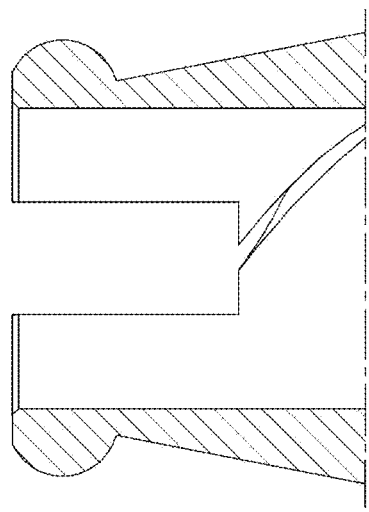

FIG. 10 is a cross-sectional view illustrating a modified embodiment of the upper portion of an abutment according to another embodiment of the present disclosure. Referring to FIG. 10, the degree of slope of a predetermined portion directly below the prosthesis fastening protrusion may be determined to be smaller than the degree of slope of the outer side surface of a portion corresponding to ⅓ of a portion between the maximum diameter portion of the abutment, on which the prosthesis margin is located, and the top end of the abutment. In some cases, a vertical portion may maintain same diameter so as to have a zero (0) degree of slope. When the prosthesis is attached to and detached from the prosthesis fastening protrusion of the abutment several times, a sharply-protruding inner portion of the prosthesis (indicated with a circle) may be abraded or cracked, which is problematic. Thus, it is possible to enhance the durability of the prosthesis matching and coupled to portion directly below the prosthesis fastening protrusion by providing the slope portion having a small degree of slope or the vertical portion having a zero degree of slope extending downward from the portion directly below the prosthesis fastening protrusion.

Figure 11:
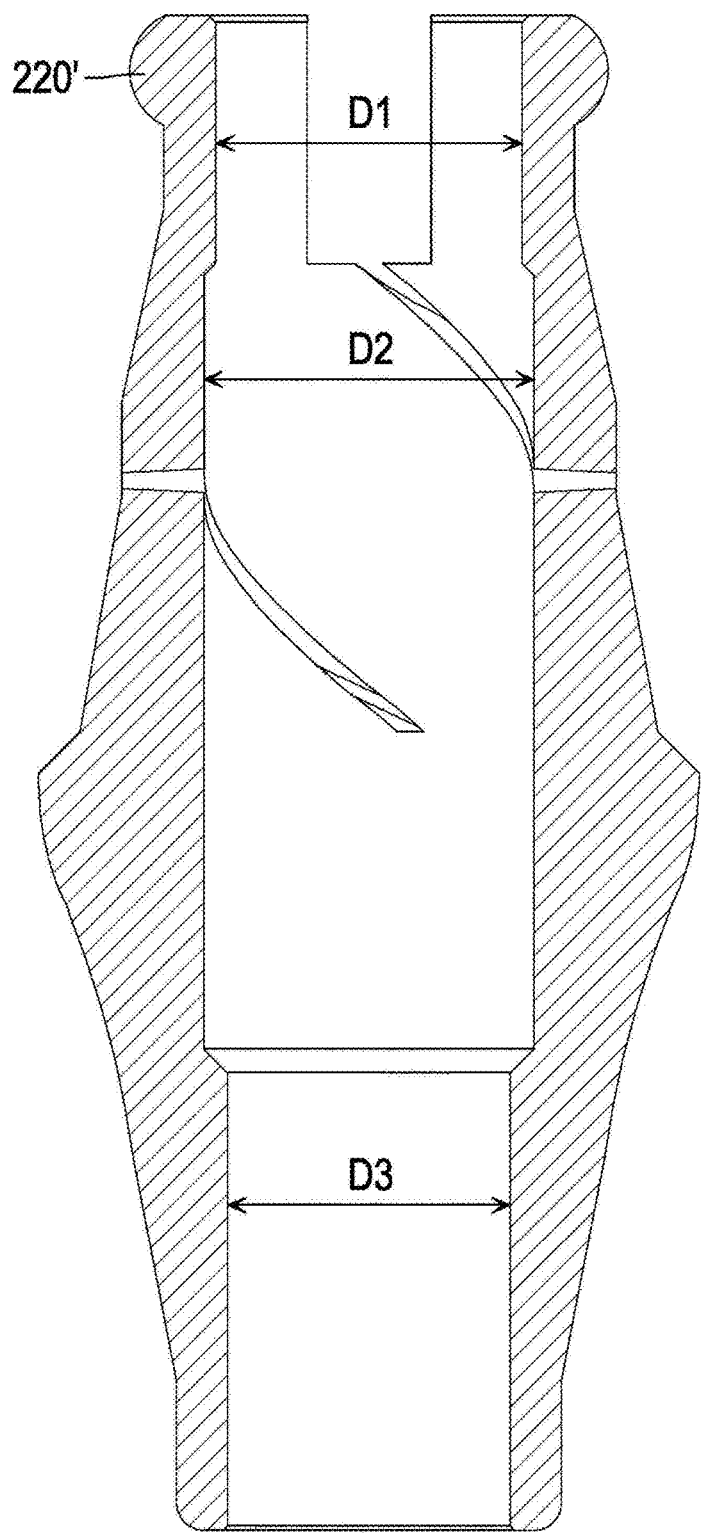
FIG. 11 is a cross-sectional view illustrating an implanting abutment according to another embodiment of the present disclosure.

FIG. 11 is a cross-sectional view illustrating an implanting abutment according to another embodiment of the present disclosure. Referring to FIG. 11, a through-hole extending from the top end surface to the bottom end surface of the abutment may be configured such that the inner diameter D1 of the upper portion of the through-hole remains the same for a predetermined length and the subsequent portion below the upper portion has a greater inner diameter D2. The through-hole structure as described above may increase the thickness of a fastening portion of the upper portion of the abutment on which a prosthesis fastening protrusion 220' is located, thereby further enhancing coupling strength when the prosthesis is fastened. The inner diameter D3 of the lower portion of the through-hole may be determined to be smaller than the inner diameter D1 of the upper portion of the through-hole.

Figure 12:
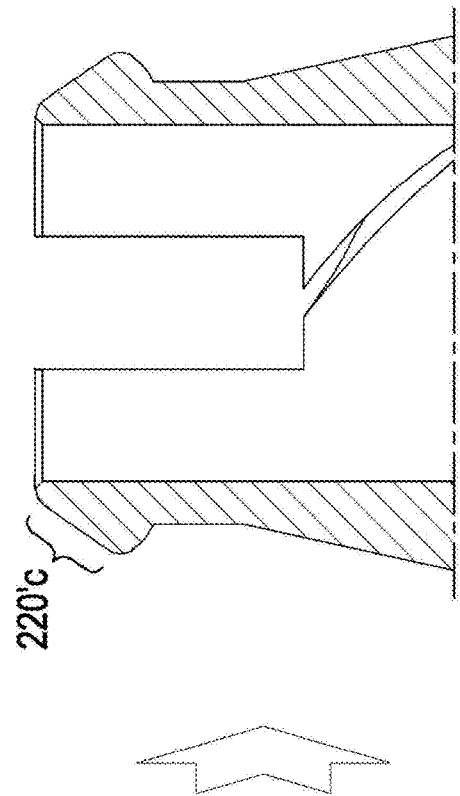
FIG. 12 is a cross-sectional view illustrating a modified embodiment of a prosthesis fastening protrusion according to another embodiment of the present disclosure.
Figure 12:
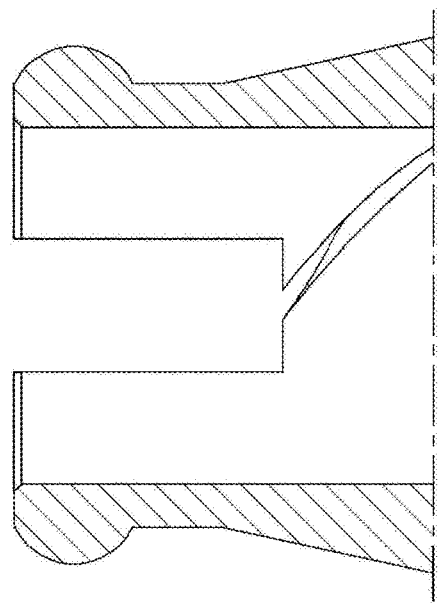
Figure 13:
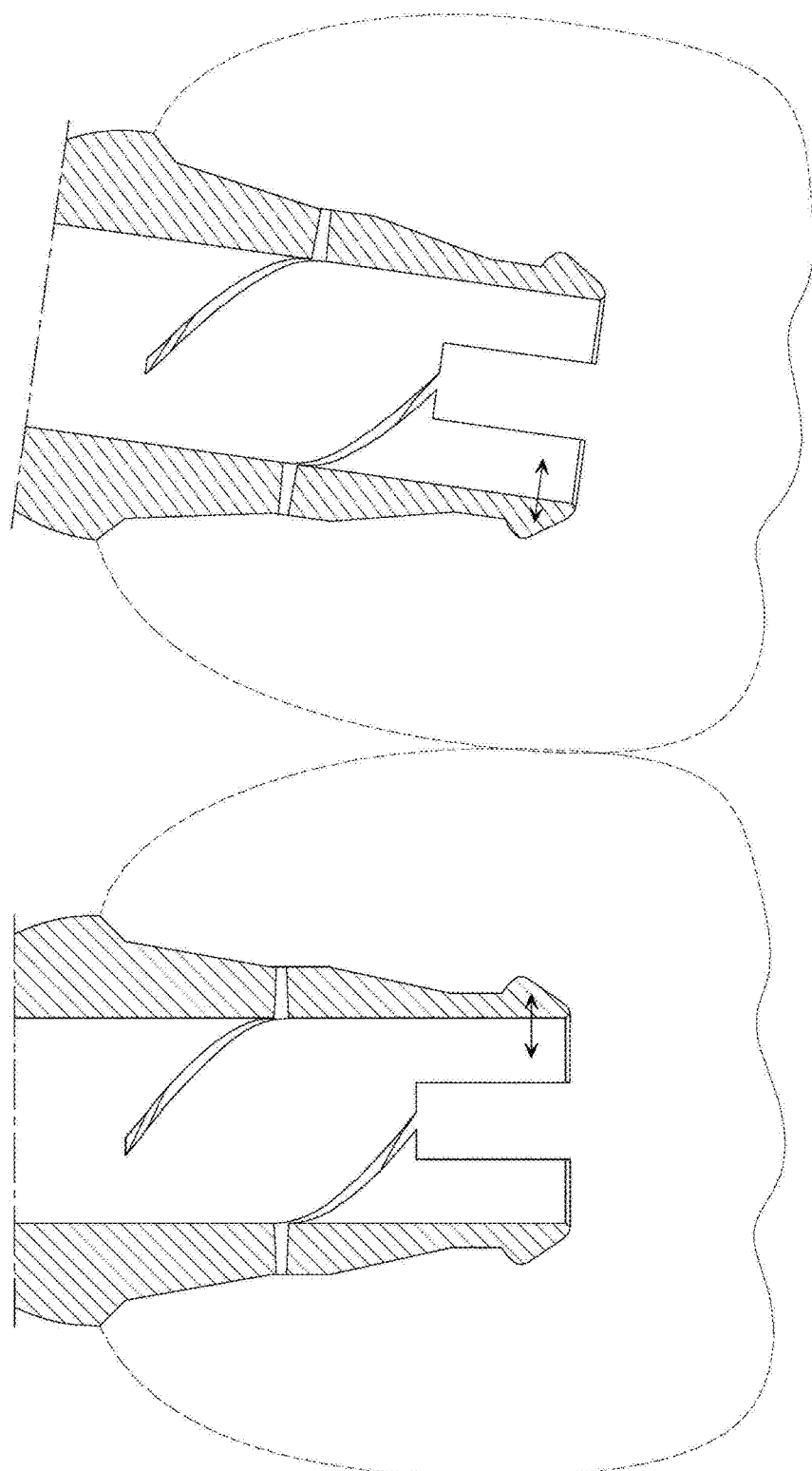
FIG. 13 is a reference view illustrating an effect that may be obtained from procedures of the abutment according to the modified embodiment illustrated in FIG. 12.
Figure 14:
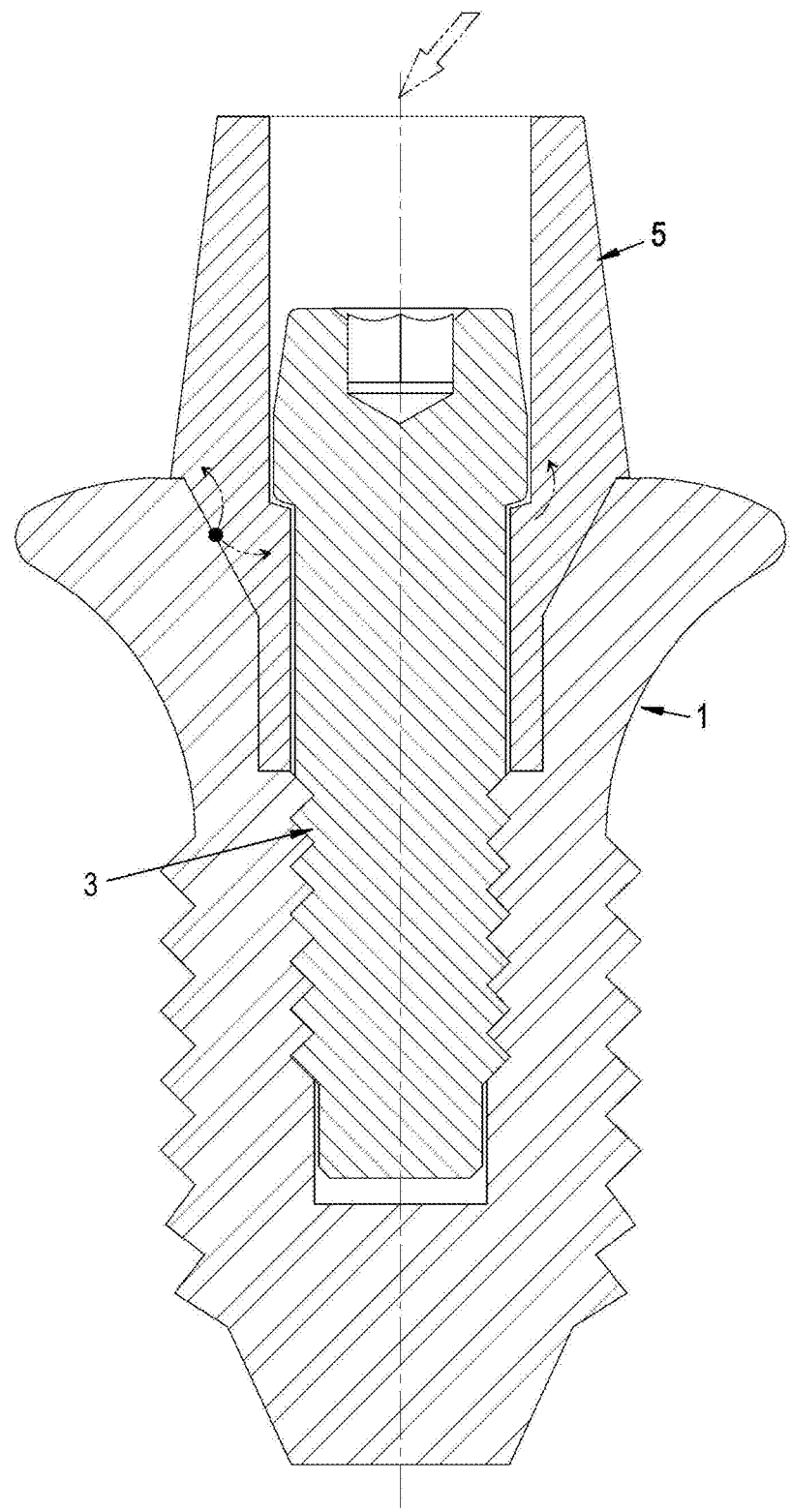
FIG. 14 is a cross-sectional view illustrating force pushing a fixing screw upward in the related art, caused by rotational force occurring when lateral occlusal force is applied to an abutment.

FIG. 12 is a cross-sectional view illustrating a modified embodiment of a prosthesis fastening protrusion according to another embodiment of the present disclosure, and FIG. 13 is a reference view illustrating an effect that may be obtained from procedures of the abutment according to the modified embodiment illustrated in FIG. 12. Referring to FIG. 12, the prosthesis fastening protrusion is configured such that the outer diameter thereof gradually increases downward from the top end. Consequently, when viewed from the vertical cross-section of the prosthesis fastening protrusion, the prosthesis fastening protrusion is vertically asymmetrical with respect to the maximum convex point of the prosthesis fastening protrusion, such that an outer side surface portion 220c' of the prosthesis fastening protrusion has a predetermined angle of slope. For example, when the outer side surface portion 220c' of the prosthesis fastening protrusion has an inclined shape, the upper distal end of the outer side surface portion 220c' may be more easily fitted into and enter a corresponding coupling hole of the prosthesis. In particular, as illustrated in FIG. 1, even in the case that fastening the prosthesis is not easy due to interference with an adjacent prosthesis having an excessively large angle of implantation, the upper distal end of the outer side surface portion 220c' of the prosthesis fastening protrusion may be more easily fitted into and more easily enter the corresponding coupling hole of the prosthesis. When the prosthesis is pressed in the direction of the abutment after the fitting, the protruding fastening portion of the prosthesis may reduce resistance while being deformed inward. At the same time, the prosthesis may relatively easily enter while sliding along the outer side surface portion 220c' the protruding fastening portion of the prosthesis.

In addition, when the prosthesis is fixed to the abutment according to the present disclosure, a space between the abutment and the prosthesis may be filled with an elastic polymer material, such as medical silicone, thereby preventing the penetration of impurities and further enhancing the elasticity of the abutment.

Although the present disclosure has been described hereinabove with respect to the specific embodiments with reference to the accompanying drawings, the present disclosure is not limited to such specific structures. Those skilled in the art will appreciate that various modifications and changes in form are possible without departing from the technical idea and the scope of right of the present disclosure. It should be understood, however, that such modified materials or changed structures occurring in design apparently belong to the scope of the present disclosure.

The invention claimed is:

1. A dental implant abutment, comprising: a prosthesis fastening protrusion protruding outward from an outer surface of an upper portion thereof on which a prosthesis is mounted, with the diameter of the prosthesis fastening protrusion being greater than the diameter of a portion located directly therebelow;
   a first indentation extending from the upper portion of the abutment and through the prosthesis fastening protrusion downward at a predetermined length in a vertical direction; and
   a second indentation extended downward to be continuous with the first indentation, starting from the bottom end of the first indentation, and having a spiral shape at predetermined length; wherein the first indentation and the second indentation divide the upper portion of the abutment into a plurality of sections.

2. The dental implant abutment according to claim 1, wherein planar portions are formed on portions of a circumferential surface on which the prosthesis fastening protrusion is formed.

3. The dental implant abutment according to claim 2, wherein each of the planar portions comprises a sloped surface.

4. The dental implant abutment according to claim 1, wherein the width of a lower portion of each of the indentations is smaller than the width of an upper portion of the indentation.

5. The dental implant abutment according to claim 1, wherein a direction in which the predetermined lengthwise portions of the spiral indentations extend downward from the top end surface is the same as a direction in which a fixing screw fastening the abutment to a fixture is rotated.

6. The dental implant abutment according to claim 1, further comprising a fixing screw, wherein the abutment is fastened to a fixture by the fixing screw, the fixing screw comprising: a threaded portion extending a predetermined vertical length and comprising a thread formed on an outer circumferential surface thereof, a head provided on top of the threaded portion and configured such that a screwdriver is fitted into a top end surface thereof, and a body connecting the threaded portion and the head and comprising a helix-shaped spiral cut portion extending a predetermined length in a longitudinal direction thereof, wherein the spiral cut portion extend a predetermined length in a longitudinal direction of a vertical center axis of the body while being parallel to the vertical center axis of the body, thereby halving a cross-sectional surface of the body perpendicular to the vertical center axis.

7. The dental implant abutment according to claim 6, wherein the head of the fixing screw further comprises a screw unfastening preventing protrusion on a predetermined portion of an outer circumferential surface thereof, wherein the screw unfastening preventing protrusion is fitted into and engaged with the spiral cut portion formed in the upper portion of the abutment in order to prevent the fixing screw from being loosened when the fixing screw is fastened to the fixture.

8. The dental implant abutment according to claim 1, wherein a plurality of slots are provided in a lower portion of the abutment configured to be fitted into an axial hole of a fixture, along a circumference of the abutment and at predetermined distances from each other, wherein at least one end of each of the slots is closed, and each of the slots extends from the outer diameter to the inner diameter of the abutment.

9. The dental implant abutment according to claim 8, wherein the slots comprise oblique lines, vertical lines, or horizontal lines.

10. The dental implant abutment according to claim 1, wherein the degree of slope of an outer side surface of the abutment changes at least two times, between an upper point of a maximum diameter portion of the abutment on which a prosthesis margin is located and a portion directly below the prosthesis fastening protrusion.

11. The dental implant abutment according to claim 1, wherein the prosthesis fastening protrusion further comprises a prosthesis fastening position recess indented inward to specify a fastening position of the prosthesis and prevent the prosthesis from rotating during mounting of the prosthesis.

12. The dental implant abutment according to claim 1, wherein the degree of slope of a predetermined portion directly below the prosthesis fastening protrusion is smaller than the degree of slope of an outer side surface of a portion corresponding to ⅓ of a portion between the maximum diameter portion of the abutment or is a zero degree of slope.

13. The dental implant abutment according to claim 1, wherein a through-hole extending from the top end surface to a bottom end surface of the abutment is configured such that an inner diameter of the upper portion of the through-hole remains the same for a predetermined length and a subsequent portion below the upper portion has a greater inner diameter.

14. The dental implant abutment according to claim 1, wherein, when viewed from a vertical cross-section of the prosthesis fastening protrusion, the prosthesis fastening protrusion is vertically asymmetrical with respect to a maximum convex point of the prosthesis fastening protrusion.

* * * * *